(12) United States Patent
Taylor et al.

(10) Patent No.: US 7,377,569 B2
(45) Date of Patent: May 27, 2008

(54) TRACKLESS CARGO BED ORGANIZER

(76) Inventors: Thomas S. Taylor, 1536 S. Crown, Westland, MI (US) 48186; Mildred P. Taylor, 1536 S. Crown, Westland, MI (US) 48186

( * ) Notice: Subject to any disclaimer, the term of this patent is extended or adjusted under 35 U.S.C. 154(b) by 152 days.

(21) Appl. No.: 11/152,624

(22) Filed: Jun. 14, 2005

(65) Prior Publication Data
US 2006/0071498 A1 Apr. 6, 2006

Related U.S. Application Data

(60) Provisional application No. 60/598,830, filed on Aug. 5, 2004.

(51) Int. Cl.
*B60N 99/00* (2006.01)
(52) U.S. Cl. .................... 296/37.6; 296/26.09; 108/44; 224/281; 224/404
(58) Field of Classification Search ............. 296/26.09, 296/37.6, 37.9; 108/44; 224/281, 404
See application file for complete search history.

(56) References Cited

U.S. PATENT DOCUMENTS

| 2,549,018 | A | | 4/1951 | Sarlo | |
|---|---|---|---|---|---|
| 2,784,027 | A | | 3/1957 | Temp | |
| 2,788,137 | A | * | 4/1957 | Harnkess | ................. 296/26.09 |
| 2,852,303 | A | | 9/1958 | Hopson | |
| 4,288,011 | A | * | 9/1981 | Grossman | .................... 224/404 |
| 4,305,695 | A | | 12/1981 | Zachrich | |
| 4,674,665 | A | * | 6/1987 | Van Kirk | ..................... 224/404 |
| 4,705,315 | A | | 11/1987 | Cherry | |
| 4,909,558 | A | | 3/1990 | Roshinsky | |
| 5,239,934 | A | * | 8/1993 | Miller et al. | .................. 108/44 |
| 5,593,272 | A | | 1/1997 | Green | |
| 5,692,794 | A | | 12/1997 | Kelsch et al. | |
| 5,820,190 | A | | 10/1998 | Benner | |
| 5,924,615 | A | * | 7/1999 | McGarrah | .................... 224/404 |
| 5,996,868 | A | | 12/1999 | Paradis | |
| 6,065,792 | A | | 5/2000 | Sciullo et al. | |
| 6,283,526 | B1 | | 9/2001 | Keough et al. | |
| 6,318,780 | B1 | | 11/2001 | St. Aubin | |
| 6,318,781 | B1 | | 11/2001 | Mc Kee | |
| 6,328,364 | B1 | | 12/2001 | Darbishire | |
| 6,695,375 | B1 | | 2/2004 | May | |
| 6,935,669 | B2 | * | 8/2005 | Staines | ....................... 296/37.1 |
| 2001/0042987 | A1 | * | 11/2001 | Getzschman et al. | ....... 296/37.6 |
| 2003/0011207 | A1 | | 1/2003 | Campbell | |
| 2005/0127699 | A1 | * | 6/2005 | Rhodus | ..................... 296/37.6 |

* cited by examiner

*Primary Examiner*—Lori L Lyjak
(74) *Attorney, Agent, or Firm*—Law Offices of John Chupa and Associates, P.C.

(57) ABSTRACT

A cargo bed organizer (10) which obviates the need for a track to be "mounted" and/or installed and/or otherwise formed in the cargo bed (350) of a selectively movable assembly (500), and which is selectively and removably received into the cargo bed (350) of a selectively movable assembly (500), and which has at least one stopping member portion (48).

21 Claims, 4 Drawing Sheets

TRACKLESS CARGO BED ORGANIZER

This application claims the benefit of prior U.S. Provisional Patent Application No. 60/598,830 which was filed on Aug. 5, 2004 with the United States Patent and Trademark Office.

FIELD OF THE INVENTION

The present invention generally relates to an organizer which is especially adapted for use within pickup truck beds or portions of other selectively movable assemblies, or other portions of a truck, and more particularly to a trackless and compartmentalized organizer which can be selectively and removably installed into the cargo bed and/or other portion of a selectively movable assembly, and which can be selectively placed in an extended position, thereby allowing selective access to the items contained within it.

BACKGROUND OF THE INVENTION

Cargo bed organizers are typically used by individuals who own vehicles, trucks, and/or other types of selectively movable assemblies which have a capacity to selectively and storably receive and transport (i.e., move) cargo and/or other items, and who wish to protect, organize and otherwise facilitate the storage and transport of the cargo and/or other items in these vehicles, trucks, or other types of selectively movable assemblies.

Typically, such prior organizer assemblies are mounted (e.g., permanently attached to or bolted) within the cargo bed of a selectively movable assembly and selectively receive items while allowing for the selective storing, transport, and/or access to the contained items.

These foregoing devices and assemblies, while allowing cargo and/or other items to be selectively stored, transported, and/or accessed within the cargo bed area of a vehicle or truck or other type of selectively movable assembly, suffer from some drawbacks. For example and without limitation, the foregoing organizer assemblies all require a track mechanism assembly (e.g. wheel rails or flanges) that must be initially mounted (i.e., permanently attached to and/or formed) within the cargo bed of the selectively movable assembly. Non-limiting examples of such assemblies typically comprise tracks and other related "guide type" assemblies. The process of installing these tracks and/or "guide type" assemblies causes permanent and structural damage and/or degradation to the cargo bed of the selectively movable assembly (or other portion of the selectively movable assembly to which they are installed), produces an overall unsightly appearance, is relatively costly, and requires ongoing maintenance. Integrally forming these assemblies within the truck bed (or other portion of the selectively movable assembly) is likewise relatively complicated and costly, and also produces a relatively unsightly overall appearance.

Further, the foregoing devices typically employ some type of "stopping mechanism" which is mounted to and/or which is formed within the selectively movable assembly bed or the organizer. These stopping mechanisms typically comprise devices such as a peg and/or other protrusion, and/or a set of chains and/or other mechanisms which connect to both the selectively movable assembly bed and the organizer, and which are not selectively removable or retractable. The foregoing devices are relatively unsightly, cause structural damage and/or degradation to the selectively movable assembly since they are typically and physically attached to the selectively movable assembly, and are not easily removed, stored, and/or otherwise modified based upon the needs of the selectively movable assembly owner.

There is therefore a need for a new and novel organizer which obviates the need for a track or other type of installed "guide assembly," and which concomitantly allows the owner of a selectively movable assembly to selectively and removably install a selectively extendable organizer into the cargo bed or other portion of the selectively movable assembly, and which overcomes at least some of the previously defined drawbacks associated with prior and/or currently utilized organizer assemblies. The present invention overcomes these drawbacks in a new and novel manner.

SUMMARY OF THE INVENTION

It is a first non-limiting object of the present invention to provide a cargo bed organizer that overcomes some or all of the previously delineated drawbacks associated with prior and/or current organizer assemblies.

It is a second non-limiting object of the present invention to provide a cargo bed organizer that overcomes some or all of the previously delineated drawbacks associated with prior and/or current organizer assemblies, and which, by way of example and without limitation, obviates the need for a track or some other type of fixed guide mechanism to be placed within a selectively movable assembly.

It is a third non-limiting object of the present invention to provide a cargo bed organizer that overcomes some or all of the previously delineated drawbacks associated with prior and/or current organizer assemblies, which obviates the need for a track or some other type of fixed guide mechanism to be placed within a selectively movable assembly, and which may be used as a "stand-alone" organizer and/or display unit when removed from the selectively movable assembly.

It is a fourth non-limiting object of the present invention to provide a cargo bed organizer that overcomes some or all of the previously delineated drawbacks associated with prior and/or current organizer assemblies, which obviates the need for a track or some other type of fixed guide mechanism to be placed within a selectively movable assembly, which may be used as a "stand-alone" organizer and/or display unit when removed from the a bed portion of a selectively movable assembly, and which has a selectively retractable stopping mechanism.

It is a fifth non-limiting object of the present invention to provide a cargo bed organizer that overcomes some or all of the previously delineated drawbacks associated with prior and/or current organizer assemblies, which obviates the need for a track or other type of fixed guide mechanism to be placed within a selectively movable assembly, which may be used as a "stand-alone" organizer and/or display unit when removed from the a bed portion of a selectively movable assembly, which has a selectively retractable stopping mechanism and which protects cargo or people riding in the truck bed from the weather.

It is a sixth non-limiting object of the present invention to provide a method for using a cargo bed organizer which overcomes some or all of the previously delineated drawbacks associated with prior and/or current organizers.

According to a first non-limiting aspect of the present invention, a trackless cargo bed organizer is provided.

According to a second non-limiting aspect of the present invention, a trackless cargo bed organizer is provided which comprises a body portion having a first "material support" surface, and a plurality of sidewall portions, and wherein said first surface and said plurality of sidewall portions cooperatively form a cavity, and wherein said organizer further includes a second surface, opposite from said first surface, containing a pin which is pivotally affixed to an axle, and wherein said pin is selectively movable from a first retracted position in which said pin is substantially resident within a depression formed within said second surface to a second extended position in which said selectively extended pin is remote from said second surface.

According to a third non-limiting aspect of the present invention, a trackless cargo bed organizer is provided comprising a first "material support" surface, and a plurality of sidewall portions, and wherein said first surface and said plurality of sidewall portions cooperatively form a cavity, and wherein said organizer includes a second surface, opposite from said first surface, and wherein said second surface includes a plurality of generally rectangular depressions, and wherein disposed within each of said plurality of rectangular depressions is a respective axle, and wherein a first side of said axle is frictionally and movably received within a unique one of said plurality of sidewall portions, and wherein a second side of said axle is received within a second unique and opposed one of said plurality of sidewall portions, and wherein each respective axle respectively receives a plurality of rolling members, and wherein said second surface, further has a pin which is pivotally affixed to an axle, and wherein said pin is selectively movable from a first retracted position in which said pin is substantially resident within a depression formed within said second surface to a second extended position in which said selectively extendable pin is remote from said second surface.

According to a fourth non-limiting aspect of the present invention, a method for using a trackless cargo bed organizer is provided, comprising the steps of:
(a) providing a trackless cargo bed organizer;
(b) selectively inserting said trackless cargo bed organizer into the cargo bed of a selectively movable assembly;
(c) placing at least one item into said selectively inserted trackless cargo bed organizer;
(d) selectively extending said trackless cargo bed organizer from said cargo bed of said selectively movable assembly; and
(e) selectively removing said at least one item from said trackless cargo bed organizer.

These and other aspects, objects, and advantages of the present invention will become apparent to one of ordinary skill in the art by reading the following detailed description of the preferred embodiment of the invention and by reference to the following drawings.

BRIEF DESCRIPTION OF THE DRAWINGS

It should be apparent that similar reference characters denote corresponding features consistently throughout the attached drawings.

DETAILED DESCRIPTION OF DRAWINGS

Referring now to FIGS. 1-6, there is shown a "trackless" organizer or "organizer assembly" 10, which is made in accordance with the teachings of the preferred embodiment of the invention and which may be used on and/or within a variety of selectively movable assemblies, such as a truck.

Figure 1:
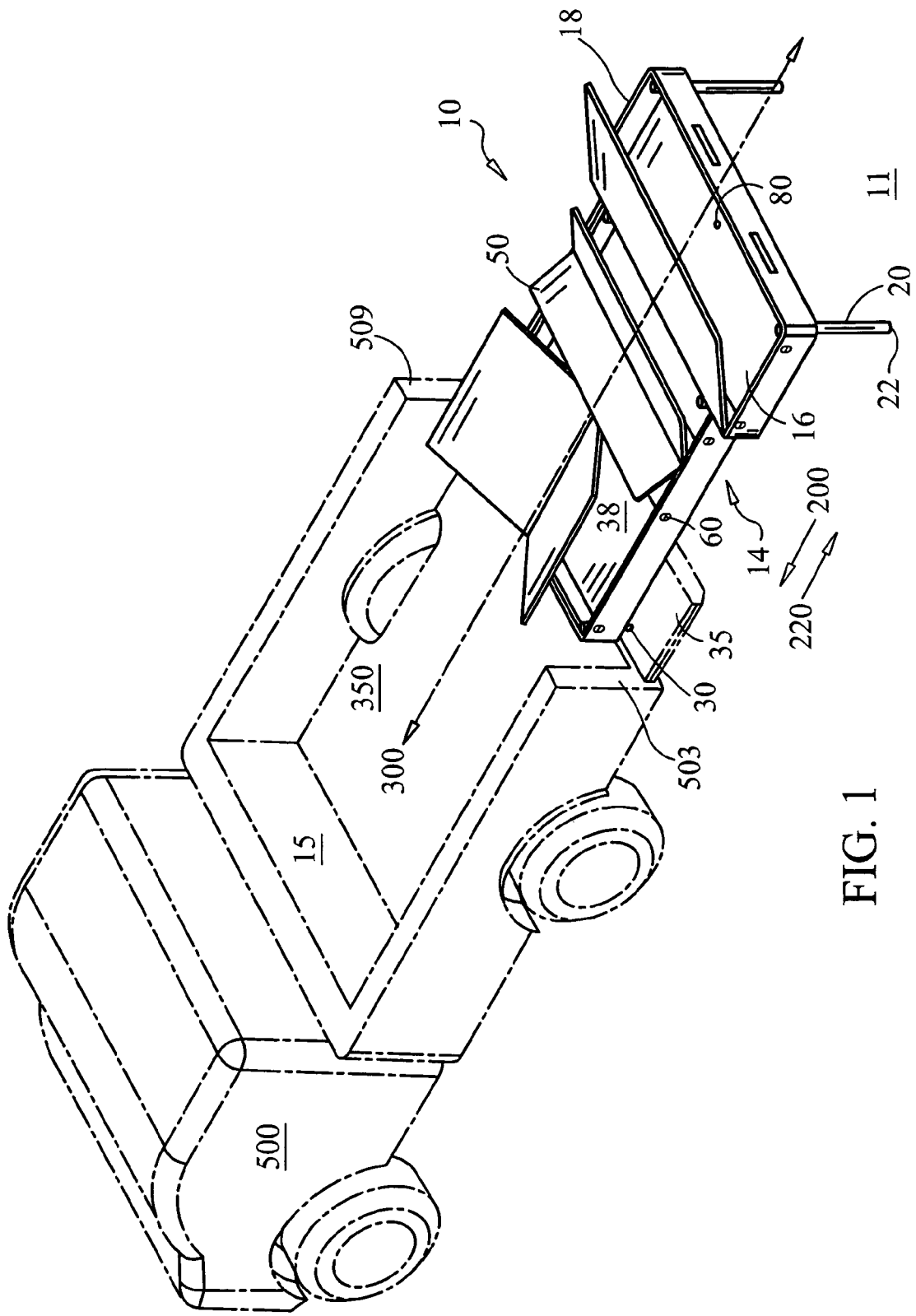
FIG. 1 is an environmental perspective view of the organizer or organizer assembly which is made in accordance with the teachings of the preferred embodiment of the invention in an extended position and in operative combination with a selectively movable assembly.
Figure 3:
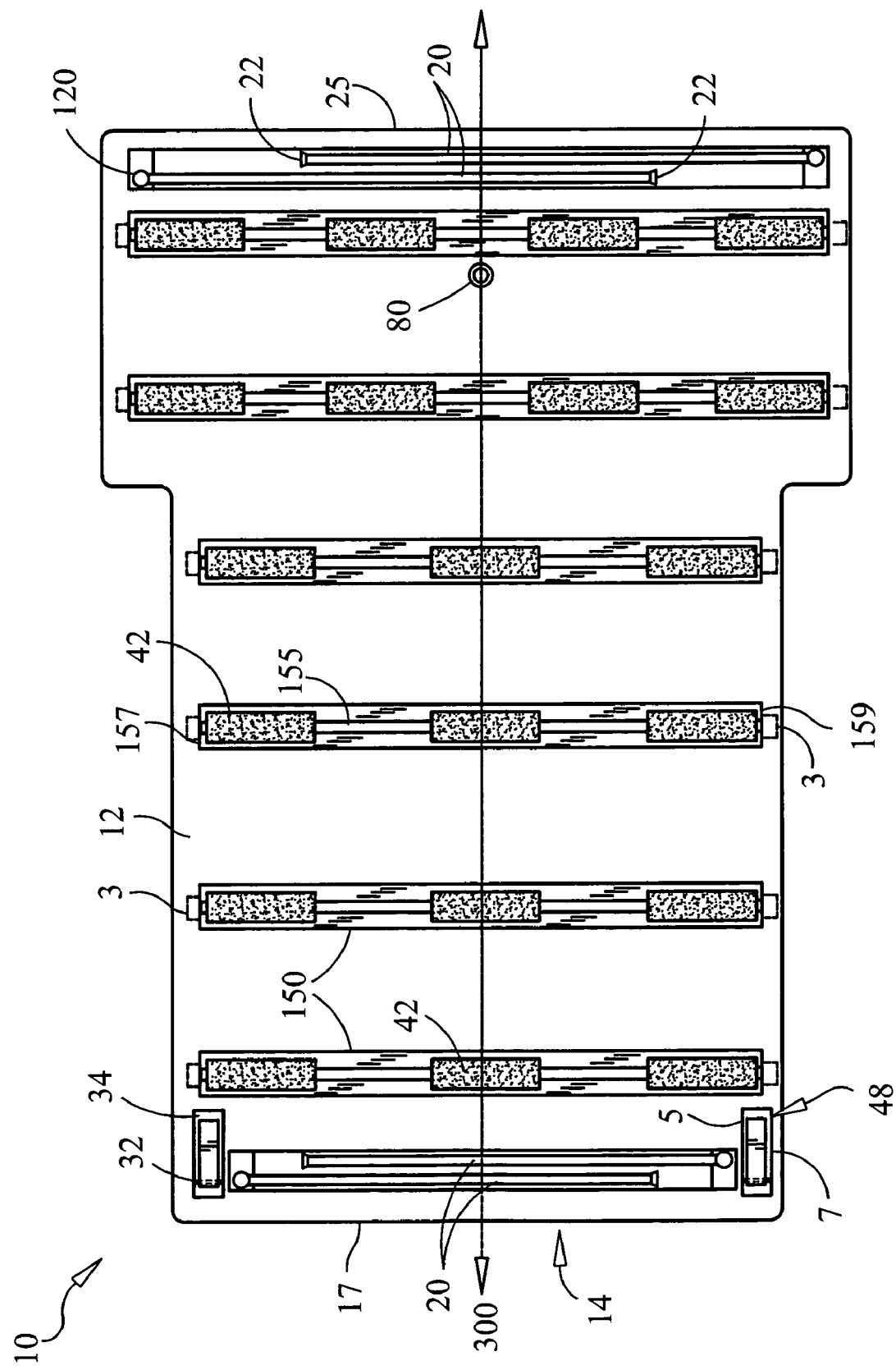
FIG. 3 is a bottom view of the organizer or organizer assembly shown in FIGS. 1 and 2.

Particularly, as best shown in FIGS. 1 and 3, the organizer or "organizer assembly" 10 comprises a body portion 14 which includes a first generally planar material support surface or portion 16, a plurality of sidewall or perimeter portions 18, which cooperatively and interconnectively are positioned around the perimeter of the portion 16 an d which are attached to the portion 16 (e.g., by glue or conventional fasteners) or which are integrally formed with portion 16. Further, each of the portions 18 may be connected by use of glue or conventional fasteners, or the portions 18 may be replaced by a single unitary piece. Portion 14 further includes a bottom surface or portion 12, which has the same shape as surface 16 and which is opposite to (i.e., is an opposite side of) the surface 16. The portions 16 and 18 cooperatively form a containment cavity 38. In one non-limiting embodiment of the invention, the body portion 14 is substantially T-shaped in cross-section, and has a first narrower end 17 which is adapted to rest nearest the front end 15 of the cargo bed 350 of a truck or other type of selectively movable assembly 500, and a second wider end 25 which is adapted to rest nearest the tailgate portion 35 of the selectively movable assembly 500, or the portion of the assembly 500 which is remote from portion 15. In one non-limiting embodiment of the present invention, the wider end 25 of body portion 14 includes at least one drainage hole 80 which protrudes through both surfaces 12, 16 and which allows liquid and/or condensation to exit the cavity 38.

It should be realized that the organizer 10 is not limited to use with any particular type of selectively movable assembly but that the assembly 500 is shown for illustrative purposes only. It should be further noted that organizer 10 may have substantially any desired shape and is not limited to the shape which is shown in the various FIGS. 1-6.

Further, in the most preferred embodiment of the invention, the body portion 14 has a longitudinal axis of symmetry 300, and a plurality of generally rectangular depressions or channels 150 which are orthogonally disposed to axis 300 and are operatively deployed and/or formed within the bottom surface 12. These depressions or channels 150 do not extend through the surface 16. In one non-limiting embodiment, the depressions or channels 150 are substantially identical and are equidistantly formed and/or deployed within the surface 12, and within each depression or channel 150 operatively and respectively lies a selectively movable axle 155. Each axle 155 movably and respectively receives at least one rolling member 42. In one non-limiting embodiment of the invention, each depression or channel 150 includes three substantially identical rolling members 42 which are disposed equidistantly from one another, and which operatively and respectively are received by an axle 155. In one non-limiting embodiment each of the rolling members 42 are substantially identical and may be created from rubber or some other soft and compressible material, and each of the rolling members 42 protrude away from cavity 38 and surface 12. Further, in one non-limiting embodiment, each axle 155 is frictionally and movably received within a unique pair of opposed sidewalls 157, 159 and within a unique one of the depressions or channels 150. It should further be realized that the shape of depressions or channels 150 may vary as desired. In one non-limiting embodiment, each axle 155 is received into a first bearing assembly 3 which is fixed into a sidewall 157 and a second substantially identical bearing assembly 3 which is fixed into sidewall 159, thereby allowing axles 155 to rotate within respective depressions or channels 150. Each channel 150 lies along a respective longitudinal axis of symmetry, and each such longitudinal axis of symmetry is parallel to each other such longitudinal axis of symmetry.

In an alternate embodiment of the present invention, the body portion 14 is formed as previously described. In this non-limiting embodiment, the depressions 150, axles 155 and rolling members 42 are absent and the outer surfaces 12, 16 of the organizer 10 are instead covered in cloth (such as carpeting).

Figure 4:
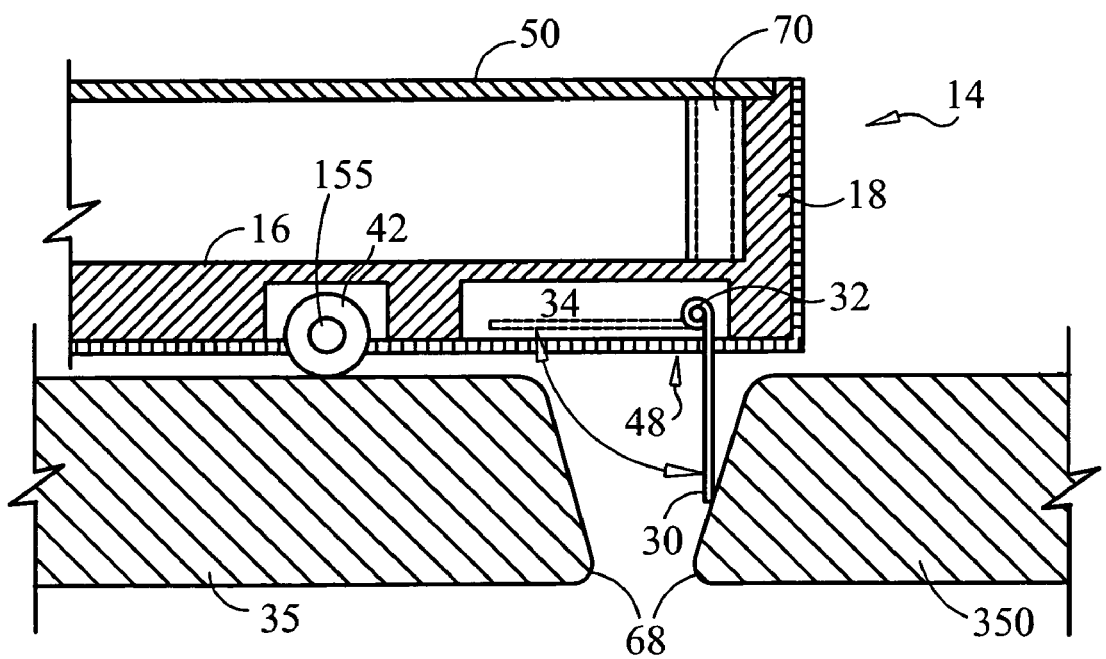
FIG. 4 is a cross-sectional view of the locking portion of the organizer or organizer assembly shown on FIGS. 1-3.

Further, as best shown in FIGS. 3 and 4; at least one stopping member portion 48 is attached to the surface 12. Particularly, within surface 12 is formed at least one recessed portion 34 which does not extend through surface 12 and which includes opposed sidewalls 5, 7 which movably and frictionally receive an axle 32 which receivably traverses a pin 30. Particularly, the selectively retractable and movable pin 30 is selectively movable from a first retracted position, in which the pin 30 is completely resident within the recessed portion 34, to a second extended position remote from the surface 12. In the most preferred embodiment, body portion 14 includes two substantially identical stopping mechanism portions 48 deployed on the narrower end 17 of second surface 12.

Figure 6:
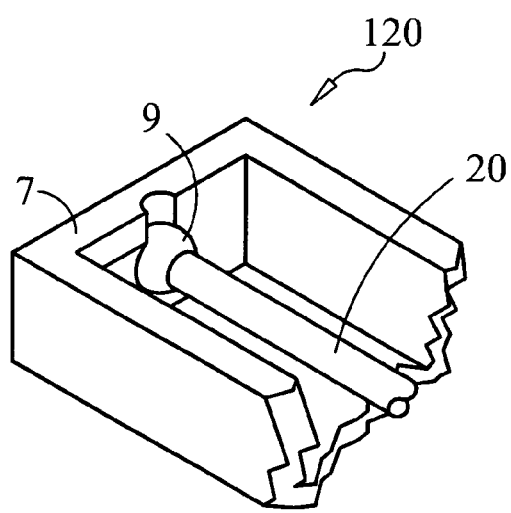
FIG. 6 is an enlarged perspective view of one of the slots shown in FIG. 3.

Further, as best shown in FIG. 3, in one non-limiting embodiment of the invention, the second surface 12 includes a plurality of selectively foldable and/or collapsible and selectively extendable pivoted legs 20, and each leg 20 is selectively movable to a first retracted position in which the leg 20 is entirely resident within a generally rectangular slot 120 deployed and/or formed within the surface 12 (but which does not extend through the surface 12), and each leg 20 can further be selectively moved to a second extended position in which each leg 20 is remote from the surface 12. In one non-limiting embodiment (as best shown in FIG. 6), each slot 120 includes a pair of substantially identical legs 20 and each leg 20 is rotatably coupled to a unique ball member 9, which is movable but securely affixed to and/or within a unique one of the endwalls 7 of the slot 120 in which the leg 20 is operatively deployed. In the most preferred embodiment of the invention, the organizer 10 has two slots 120, and two selectively retractable and/or foldable legs are coupled to each slot 120, and each leg 20 respectively terminates in a pad 22, which touches the surface 11 upon which the movable assembly 500 resides.

Figure 5A:
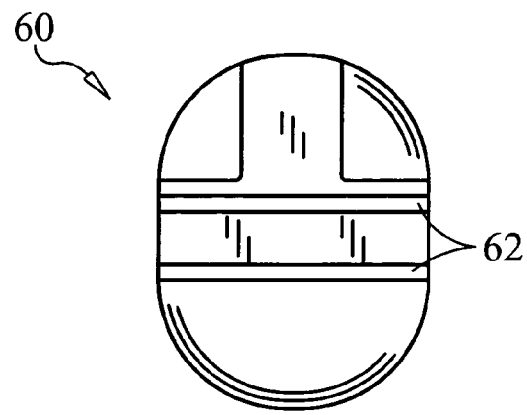
FIG. 5A is an elevational view of a T-clip assembly used in the organizer or organizer assembly.
Figure 5B:
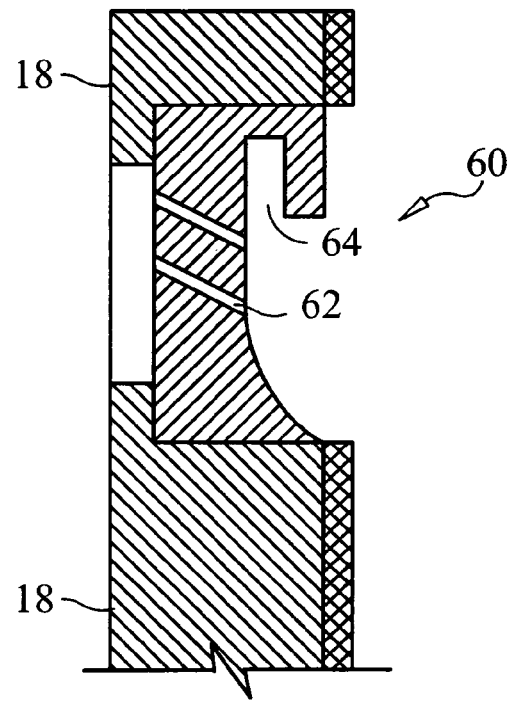
FIG. 5B is a cross-sectional view of the T-clip assembly shown in FIG. 5A.

Additionally, in one-non limiting embodiment, the outside surface of sidewall portion 18 includes a plurality of t-clips 60 which, as best shown in FIGS. 5(*a-b*), are disposed upon (i.e., glued, fastened, or otherwise attached to or disposed within) the sidewall portion 18 and include a pair of substantially identical vent channels 62 which are adapted to prevent and/or reduce the likelihood of having water, dirt, and/or other undesirable substances enter the cavity 38, but concomitantly allowing the passage of air through the t-clips 60 and into the cavity 38. In this non-limiting embodiment, the t-clips 60 also include a slot 64 which is adapted to selectively and removably receive a hook and/or other attachment mechanism such as is found on the end of a "bungee cord" and/or other type of item used to tie cargo items in place.

Further, in another non-limiting embodiment, the sidewall or perimeter portion 18 includes a plurality of generally rectangular hook, retention, and/or other type of and substantially hollow and columnar type portions 70 which are glued and/or otherwise attached to or formed from the sidewall portion 18 and within cavity 38. Each portion 70 is adapted to receive a tent pole, flagpole and/or other type of upright support members.

Additionally, in one non-limiting embodiment, one or more lids, such as lid 50, may movably and selectively reside upon the perimeter surface 18 and cooperate with the perimeter surface 18 to form a selectively closed cavity 38.

In operation, the organizer 10 can be selectively and removably inserted into the cargo bed area 350 of a selectively movable assembly or other selectively movable assembly such as selectively movable assembly 500. In one non-limiting embodiment when pressure and/or force is applied in the direction of arrow 200 to the body portion 14, the rolling members 42 respectively and cooperatively rotate within a unique one of the depressions 150, thereby frictionally engaging the bed 350 of the selectively movable assembly 500, which is effective to selectively move the body portion 14 into the bed 350. When pressure and/or force is applied in the direction of arrow 220 to the body portion 14, the rolling members 42 likewise frictionally and cooperatively engage the bed 350, effective to move the body portion 14 out of the selectively movable assembly 500.

Figure 2:
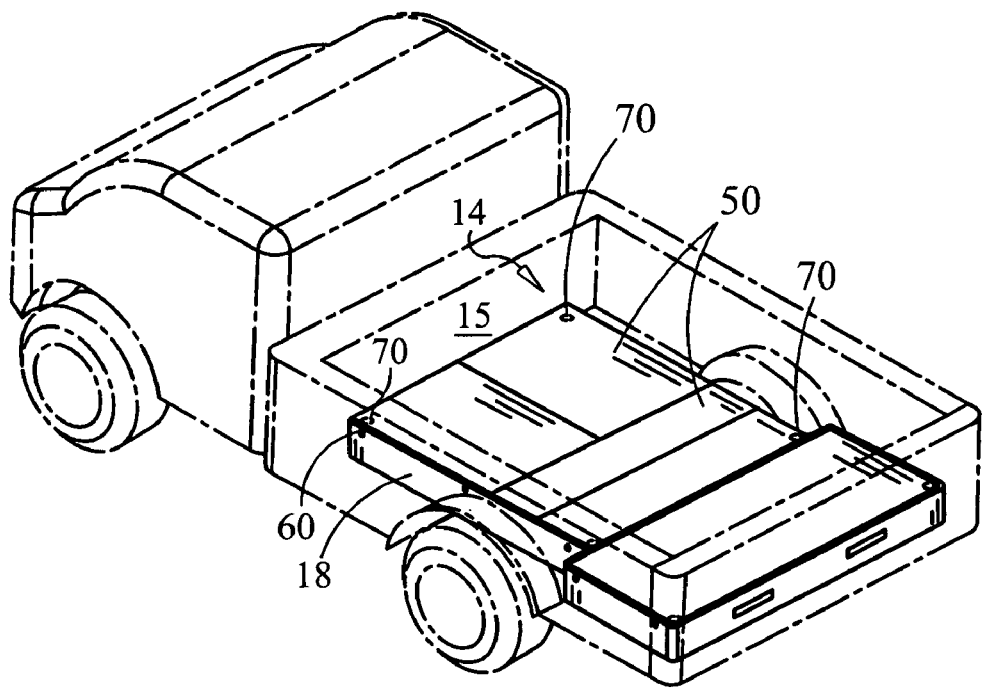
FIG. 2 is an environmental perspective view of the organizer or organizer assembly as shown in FIG. 1, but in a selectively recessed or retracted position.

It should be realized that the tailgate portion 35 of the selectively movable assembly 500 is selectively movable from a first closed position (e.g., selectively abutting portions 503, 509, as shown in FIG. 2), to a second open position (shown in FIG. 1), and when the organizer 10 is selectively being moved into or out of the bed 350 of the selectively movable assembly 500, the tailgate portion 35 will be in the second open position, and that when the tailgate portion 35 is in this second open position, there is a substantial gap 68 between the end of the cargo bed 350 and the tailgate portion 35. When the stopping mechanism portion 48 is directly over the gap 68, the selectively movable pin 30 of the stopping mechanism portion can be selectively extended into the gap 68, effective to restrict the organizer 10 from being completely moved away from and/or out of the cargo bed 350.

In another non-limiting embodiment, the organizer 10 can in operation be selectively extended in at least two positions. For example and without limitation, the pair of legs 20 closer to the wide end 25 of body portion 14 may be selectively extended and the body portion 14 supported cooperatively by the legs 20 and the cargo bed 350. Alternatively, the body portion 14 may be first supported in the previous manner, and then the second pair of legs 20 may be selectively extended, whereby the body portion is no longer supported by the cargo bed 350 and the movable assembly 500 may selectively be moved away from the organizer 10.

Further, in the previously described embodiment, two stopping mechanism portions 48 cooperatively and selectively engage the tailgate portion 35 to prevent the organizer 10 from being completely moved away from the selectively movable assembly cargo bed.

It is to be understood that the invention is not limited to the exact construction which has been illustrated, but that various changes and modifications may be made without departing from the spirit and the scope of the invention as delineated in the following claims. From the foregoing it should be apparent that the organizer 10 obviates the need for a track and/or other "guide type" mechanism to be mounted, attached, and/or formed within the cargo bed 350 of a selectively movable assembly 500, and is therefore "trackless", and that the organizer 10 further serves a purpose of efficiently storing, organizing, displaying and transporting cargo and/or other items.

What is claimed is:

1. A trackless cargo bed organizer comprising a body portion having a first "material support" surface, and a plurality of sidewall portions, and wherein said first surface and said portion cooperatively form a containment cavity, and wherein said organizer further includes a second surface, opposite from said first surface, and wherein said second surface includes a plurality of generally rectangular depressions.

2. The trackless cargo bed organizer of claim 1 wherein said plurality of generally rectangular depressions operatively include an axle and a plurality of substantially identical rolling members and wherein each of said plurality of generally rectangular depressions are parallel to each other.

3. The trackless cargo bed organizer of claim 2, wherein cloth covers outside surfaces of an organizer compartment.

4. The trackless cargo bed organizer of claim 3 wherein upon said plurality of sidewall portions are disposed a plurality of vented t-clips, and wherein said plurality of vented t-clips are adapted to selectively and removably receive ends of elastic-type tie-down cords.

5. The trackless cargo bed organizer of claim 4 wherein said second surface includes a plurality of substantially identical slots, and wherein a plurality of selectively retractable or collapsible or foldable legs are each respectively and rotatably coupled to a respective unique one of said plurality of substantially identical slots, and wherein said plurality of selectively retractable or collapsible or foldable legs are each adapted to selectively support said trackless cargo bed organizer.

6. The trackless cargo bed organizer of claim 5 further comprising at least one lid, wherein said at least one lid or lids is adapted to be selectively and removably disposed upon and frictionally engaged by said trackless cargo bed organizer.

7. A trackless cargo bed organizer comprising a body portion having a first "material support" surface, and a plurality of sidewall portions, and wherein said first "material support" surface and said plurality of sidewall portions cooperatively form a containment cavity, and wherein said trackless cargo bed organizer further includes a second surface, opposite from said first "material support" surface, containing a pin which is pivotally affixed to an axle, and wherein said pin is selectively movable from a first retracted position in which said pin is substantially resident within a depression formed within said second surface to a second extended position in which said pin is remote from said second surface.

8. The trackless cargo bed organizer of claim 7 wherein said second surface includes a plurality of generally rectangular depressions.

9. The trackless cargo bed organizer of claim 8 wherein each unique one of said plurality of operatively include an axle and a plurality of substantially identical rolling members.

10. The trackless cargo bed organizer of claim 9, wherein cloth covers outside surfaces of an organizer compartment.

11. The trackless cargo bed organizer of claim 10 wherein a bottom portion has at least one drainage hole.

12. The trackless cargo bed organizer of claim 11 wherein upon said sidewall portions are disposed a plurality of vented t-clips, and wherein said plurality of vented t-clips are adapted to selectively and removably receive ends of elastic-type tie-down cords.

13. The trackless cargo bed organizer of claim 12 wherein said second surface includes a plurality of substantially identical slots, and wherein a plurality of selectively retractable or collapsible or foldable legs are each respectively and rotatably coupled to a respective unique one of said plurality of substantially identical slots, and wherein said plurality of legs are each adapted to selectively support said trackless cargo bed organizer.

14. The trackless cargo bed organizer of claim 13 further comprising at least one lid, wherein said at least one lid or lids is adapted to be selectively and removably disposed upon and engaged by said trackless cargo bed organizer.

15. A trackless cargo bed organizer comprising a first "material support" surface, and a plurality of sidewall portions, and wherein said first "material support" surface and said plurality of sidewall portions cooperatively form a cavity, and wherein said trackless cargo bed organizer includes a second surface, opposite from said first "material support" surface, and wherein said second surface includes a plurality of generally rectangular depressions, and wherein disposed within each of said plurality of generally rectangular depressions is a respective axle, and wherein a first side of said axle is frictionally and movably received within an unique one of said plurality of sidewall portions, and wherein a second side of said axle is received within a second unique and opposed one of said plurality of sidewall portions, and wherein each respective axle respectively receives a plurality of rolling members, and wherein said second surface, further has a pin which is pivotally affixed to an axle, and wherein said pin is selectively movable from a first retracted position in which said pin is substantially resident within a depression formed within said second surface to a second extended position in which said pin is remote from said second surface.

16. The trackless cargo bed organizer of claim 15 wherein a bottom portion has at least one drainage hole.

17. The trackless cargo bed organizer of claim 16 wherein said plurality of sidewall portions include a plurality of vented t-clips, and wherein said plurality of vented t-clips are adapted to selectively and removably receive ends of elastic-type tie-down cords.

18. The trackless cargo bed organizer of claim 17 wherein said second surface includes a plurality of substantially identical slots, and wherein a plurality of selectively retractable or collapsible or foldable legs are each respectively and rotatably coupled to a respective unique one of said plurality of substantially identical slots, and wherein said plurality of legs are each adapted to selectively support said trackless cargo bed organizer.

19. The trackless cargo bed organizer of claim 18 further comprising at least one lid, wherein said at least one lid or lids is adapted to be selectively and removably disposed upon and engaged by said trackless cargo bed organizer.

20. A method for using a trackless cargo bed organizer, comprising the steps of:
(a) forming a trackless cargo bed organizer having a first "material support" surface and a plurality of sidewall portions forming a containment cavity, and a second opposed surface; and (b) providing a trackless cargo bed organizer;
(c) selectively inserting said trackless cargo bed organizer into the cargo bed of a selectively movable assembly;
(d) placing at least one item into said selectively inserted trackless cargo bed organizer;
(e) selectively extending said trackless cargo bed organizer from said cargo bed of said selectively movable assembly;
(f) selectively removing said at least one item from said trackless cargo bed organizer; and
(g) forming a pin which is pivotally affixed to an axle, and wherein said pin is selectively movable from a first retracted position in which said pin is substantially resident within a depression formed within a second surface to a second extended position in which said pin is remote from said second surface, thereby preventing removal of said trackless cargo bed organizer from said portion of said selectively movable assembly.

21. The method of claim 20 further comprising the steps of forming a plurality of substantially identical slots, and wherein a plurality of selectively retractable or collapsible or foldable legs are each respectively and rotatably coupled to a respective unique one of said plurality of substantially identical slots, and wherein said plurality of legs are each adapted to selectively support said trackless cargo bed organizer.

* * * * *